US012769337B2

(12) United States Patent
Miyamoto et al.

(10) Patent No.: US 12,769,337 B2
(45) Date of Patent: Oct. 20, 2026

(54) DATA PROCESSING DEVICE, MOBILE BODY SYSTEM, MOBILE BODY, DATA PROCESSING METHOD, AND STORAGE MEDIUM

(71) Applicant: KABUSHIKI KAISHA TOSHIBA, Tokyo (JP)

(72) Inventors: Takuya Miyamoto, Kawasaki (JP); Akihiro Mori, Kawasaki (JP); Daisuke Yamamoto, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 25 days.

(21) Appl. No.: 18/826,408

(22) Filed: Sep. 6, 2024

(65) Prior Publication Data

US 2024/0427354 A1 Dec. 26, 2024

Related U.S. Application Data

(63) Continuation of application No. PCT/JP2023/011863, filed on Mar. 24, 2023.

(30) Foreign Application Priority Data

Mar. 24, 2022 (JP) ................................ 2022-048256

(51) Int. Cl.
*G05D 1/80* (2024.01)
*G07C 5/08* (2006.01)
*G05D 105/28* (2024.01)

(52) U.S. Cl.
CPC ............ *G05D 1/80* (2024.01); *G07C 5/0808* (2013.01); *G05D 2105/28* (2024.01)

(58) Field of Classification Search
CPC ...... G05D 1/80; G05D 2105/28; G05D 1/245; G05D 2107/70; G05D 2109/10; G05D 2111/52; G05D 2111/54; G07C 5/0808
See application file for complete search history.

(56) References Cited

U.S. PATENT DOCUMENTS 10,055,988 B2 * 8/2018 Warren .................. G07C 5/008
10,434,647 B2 * 10/2019 Oaki ...................... B25J 9/1676
(Continued)

FOREIGN PATENT DOCUMENTS

JP 2000330632 A * 11/2000
JP WO2008/153122 A1 12/2008
(Continued)

*Primary Examiner* — Kai Wang
(74) *Attorney, Agent, or Firm* — Oblon, McClelland, Maier & Neustadt, L.L.P.

(57) ABSTRACT

According to one embodiment, a data processing device is configured to process data related to a mobile body. The mobile body moves by autonomously traveling over a traveling surface. The data processing device is further configured to calculate a first error occurring in a first movement from a first position to a transit position. The first movement includes a translational motion and a turning motion. The data processing device is further configured to predict, based on the first error, a second error occurring in a second movement from the transit position to a second position. The second movement includes a turning motion. The data processing device is further configured to correct a movement amount of the mobile body in the second movement by using the first and second errors.

17 Claims, 13 Drawing Sheets

(56) References Cited

U.S. PATENT DOCUMENTS

| | | | | |
|---|---|---|---|---|
| 10,438,424 | B2 * | 10/2019 | Hassib | G06F 17/00 |
| 10,679,507 | B2 * | 6/2020 | Fujishima | B60R 21/00 |
| 11,137,768 | B2 * | 10/2021 | Terada | G05D 1/0231 |
| 11,358,706 | B2 * | 6/2022 | Coco | B64C 17/02 |
| 11,945,448 | B2 * | 4/2024 | Ferguson | B60W 40/09 |
| 2016/0152241 | A1 * | 6/2016 | Denda | B60W 40/10 701/23 |
| 2018/0172455 | A1 * | 6/2018 | Yamaguchi | G01C 21/005 |
| 2022/0070619 | A1 * | 3/2022 | White | H04M 1/72454 |
| 2022/0073084 | A1 | 3/2022 | Sakai et al. | |
| 2022/0097742 | A1 * | 3/2022 | Okazaki | B61L 15/0058 |
| 2022/0197296 | A1 | 6/2022 | Suzuki et al. | |
| 2022/0404495 | A1 | 12/2022 | Mori et al. | |
| 2023/0348248 | A1 * | 11/2023 | Yamamoto | B66F 9/063 |
| 2024/0111307 | A1 * | 4/2024 | Kumagai | G05D 1/622 |

FOREIGN PATENT DOCUMENTS

| | | | | |
|---|---|---|---|---|
| JP | 5099130 | B2 * | 12/2012 | G05D 1/0246 |
| JP | 2017-4228 | A | 1/2017 | |
| JP | 2019-113934 | A | 7/2019 | |
| JP | 2020-106357 | A | 7/2020 | |
| JP | 2020-177289 | A | 10/2020 | |
| JP | 2021-89673 | A | 6/2021 | |
| JP | 2021-89763 | A | 6/2021 | |
| JP | 2023-901 | A | 1/2023 | |

* cited by examiner

DATA PROCESSING DEVICE, MOBILE BODY SYSTEM, MOBILE BODY, DATA PROCESSING METHOD, AND STORAGE MEDIUM

CROSS-REFERENCE TO RELATED APPLICATIONS

This is a continuation application of International Patent Application PCT/JP2023/011863, filed on Mar. 24, 2023. This application also claims priority to Japanese Patent Application No. 2022-048256, filed on Mar. 24, 2022. The entire contents of which are incorporated herein by reference.

FIELD

Embodiments described herein relate generally to a data processing device, a mobile body system, a mobile body, a data processing method, and a storage medium.

BACKGROUND

There is a mobile body that moves by autonomously traveling over a traveling surface such as a floor surface or the like. Technology is desirable in which the mobile body can move with higher accuracy to a set position.

DETAILED DESCRIPTION

Figure 1A:
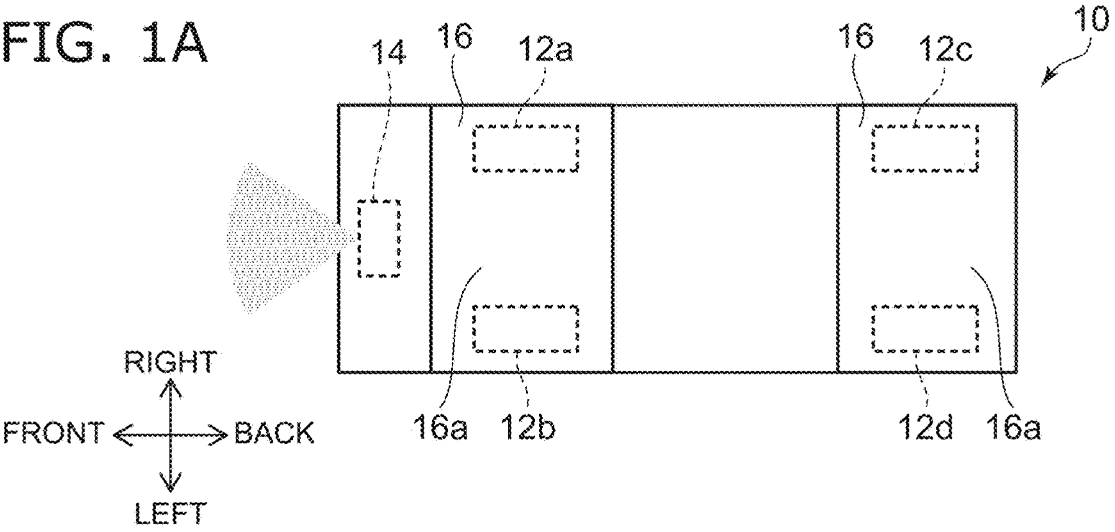
FIGS. 1A to 1C are respectively a plan view, a side view, and a bottom view schematically showing a mobile body according to an embodiment.

According to one embodiment, a data processing device is configured to process data related to a mobile body. The mobile body moves by autonomously traveling over a traveling surface. The data processing device is further configured to calculate a first error occurring in a first movement from a first position to a transit position. The first movement includes a translational motion and a turning motion. The data processing device is further configured to predict, based on the first error, a second error occurring in a second movement from the transit position to a second position. The second movement includes a turning motion. The data processing device is further configured to correct a movement amount of the mobile body in the second movement by using the first and second errors.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

An invention according to an embodiment is related to a mobile body, a data processing device, and a mobile body system including the mobile body and the data processing device. The data processing device processes data necessary for the mobile body to travel. As an example, the mobile body is an automated guided vehicle (AGV) and can move autonomously to a designated position by traveling over a floor surface. For example, after loading an object on the mobile body at some position, the mobile body automatically moves to a designated position. The loaded object is unloaded from the mobile body at the position after moving. The mobile body may pull the object. The mobile body may be a rail guided vehicle (RGV) moving along a preset trajectory. The mobile body may include, as a mobile mechanism, two-wheel drive or four-wheel drive wheels, or a caterpillar. The mobile body may include a multi-legged mechanism having two or more legs.

Figure 1B:
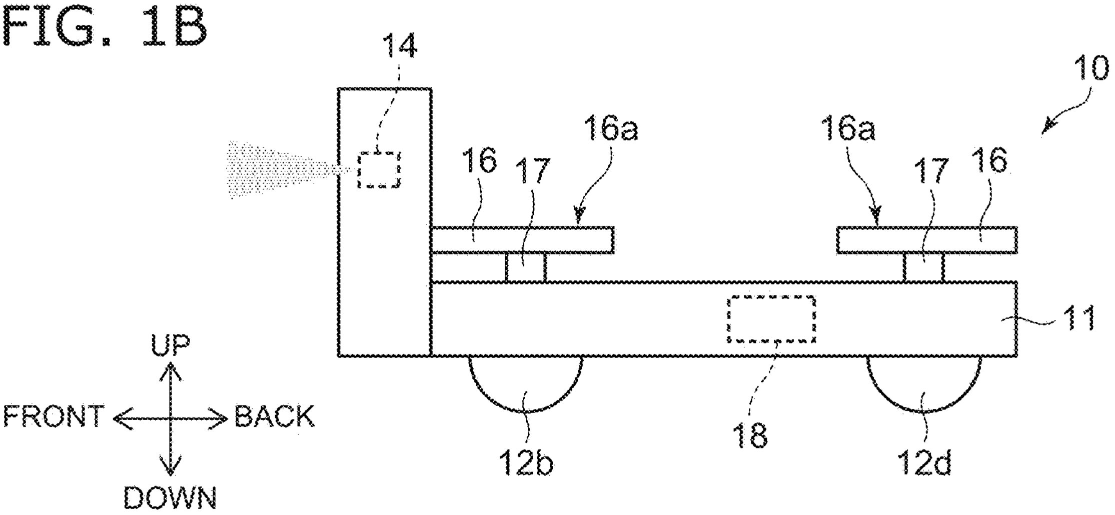
Figure 1C:
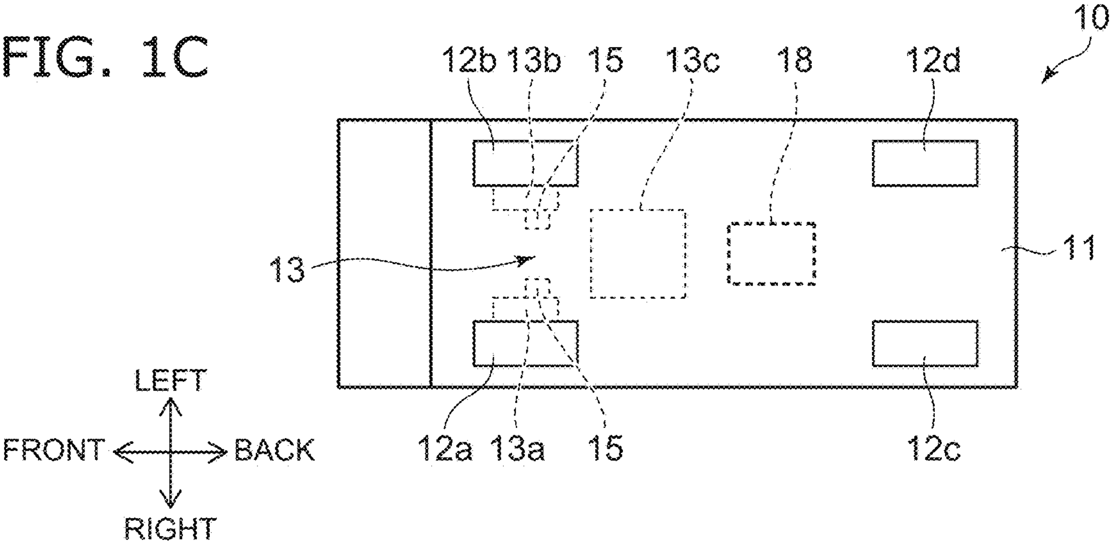

FIGS. 1A to 1C are respectively a plan view, a side view, and a bottom view schematically showing a mobile body according to an embodiment.

Specific examples of the mobile body will now be described with reference to FIGS. 1A to 1C. As shown in FIGS. 1A to 1C, the mobile body 10 according to the embodiment includes a vehicle body 11, wheels 12, a drive source 13, an external sensor 14, an internal sensor 15, a pedestal 16, a raising/lowering device 17, and a control device 18. Multiple wheels 12 are mounted to the bottom part of the vehicle body 11. In the illustrated example, the multiple wheels 12 include a pair of drive wheels 12*a* and 12*b* located at the front of the vehicle body 11, and a pair of idler wheels 12*c* and 12*d* located at the back of the vehicle body 11. The drive source 13 includes a motor 13*a*, a motor 13*b*, a battery 13*c*, etc. The motors 13*a* and 13*b* respectively drive the drive wheels 12*a* and 12*b*.

In the illustrated example, the mobile body 10 moves over the traveling surface by a differential drive technique. Specifically, the mobile body 10 translates frontward (travels forward) by causing normal rotation of the drive wheels 12*a* and 12*b* at equal rotational speeds. The mobile body 10 translates backward (travels backward) by causing reverse rotation of the drive wheels 12*a* and 12*b* at equal rotational speeds. The mobile body 10 turns frontward and leftward by causing normal rotation of the drive wheel 12*b*, and by causing normal rotation of the drive wheel 12*a* at a higher rotational speed than the drive wheel 12*b*. The mobile body 10 may rotate leftward by causing normal rotation of the drive wheel 12*a*, and by causing reverse rotation of the drive wheel 12*b* at the same rotational speed as the drive wheel 12*a*. Herein, rotational motion is treated as one type of turning motion. The mobile body 10 turns backward and leftward by causing reverse rotation of the drive wheel 12*b*, and by causing reverse rotation of the drive wheel 12*a* at a higher rotational speed than the drive wheel 12*b*. The mobile body 10 turns frontward and rightward by causing normal rotation of the drive wheel 12*a*, and by causing normal rotation of the drive wheel 12*b* at a higher rotational speed than the drive wheel 12*a*. The mobile body 10 may rotate rightward by causing reverse rotation of the drive wheel 12*a*, and by causing normal rotation of the drive wheel 12*b* at the same rotational speed as the drive wheel 12*a*. The mobile body 10 turns backward and rightward by causing reverse rotation of the drive wheel 12*a*, and by causing reverse rotation of the drive wheel 12*b* at a higher rotational speed than the drive wheel 12*a*. The mobile body 10 cannot move linearly leftward or rightward.

The external sensor 14 (a second sensor) detects information outside the mobile body 10. For example, the external sensor 14 is a laser rangefinder (LRF) located at the front or back of the mobile body 10. The LRF measures the distances between the mobile body 10 and surrounding objects. The external sensor 14 may be a camera. The camera images the surroundings of the mobile body 10. Both a LRF and a 5 camera may be included as the external sensor 14.

The internal sensor 15 (a first sensor) detects information inside the mobile body 10. For example, the internal sensor 15 is an acceleration sensor or an angular velocity sensor. The acceleration sensor or the angular velocity sensor detects the 10 acceleration or the angular velocity when the mobile body 10 moves. The internal sensor 15 may be an encoder that detects the rotational speed of a motor. In such a case as shown in FIG. 1C, a pair of internal sensors are located respectively at the motors 13*a* and 13*b*. Two or more selected from an acceleration 15 sensor, an angular velocity sensor, and an encoder may be included as the internal sensor 15.

The pedestal 16 is located at a portion of the vehicle body 11 and includes a placement surface 16*a*. The placement surface 16*a* faces upward. When the mobile body 10 is placed on a horizontal traveling surface, the placement surface 16*a* also is horizontal. An object can be placed on the placement surface 16*a*. The raising/lowering device 17 raises or lowers the pedestal 16. The control device 18 controls operations of the mobile body 10. Specifically, the control device 18 controls the drive source 13 so that the mobile body 10 moves according to a movement plan. The control device 18 also receives and processes data acquired by the external sensor 14 and the internal sensor 15. The control device 18 operates the raising/lowering device 17 to raise and lower the object.

A movement command to the mobile body 10 may be transmitted from a higher-level system. The mobile body 10 may read a movement command that is preset. A movement command of the mobile body 10 may be set by direct input by a person. 35 FIGS. 2A and 2B are perspective views schematically showing the mobile body according to the embodiment.

Figure 2A:
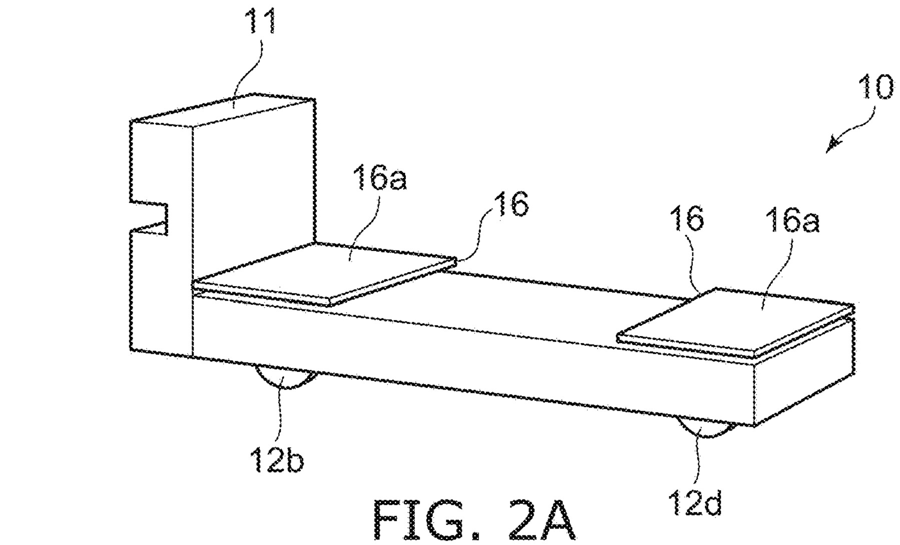
FIGS. 2A and 2B are perspective views schematically showing the mobile body according to the embodiment.
Figure 2B:
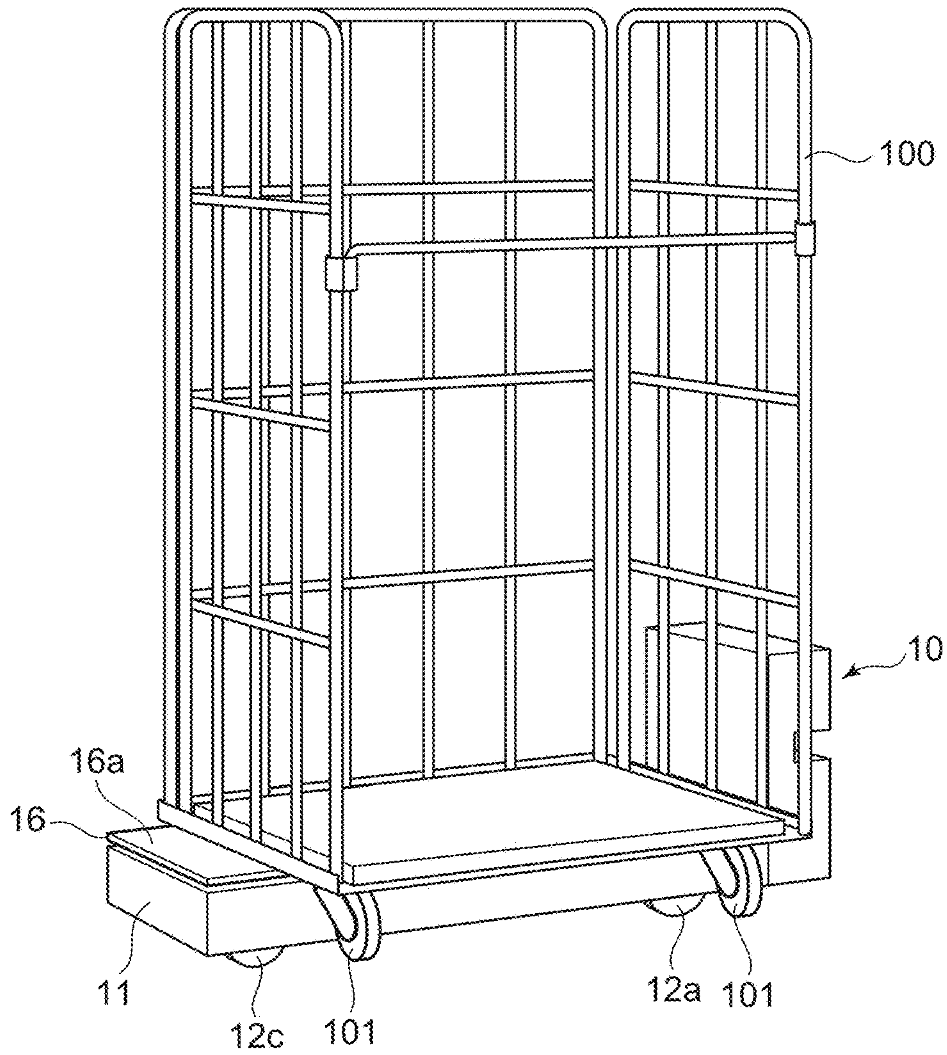

As shown in FIG. 2A, the pedestal 16 is located at a low position of the vehicle body 11. Therefore, as shown in FIG. 2B, the mobile body 10 can move so that the pedestal 16 is positioned under another object. In the illustrated example, the mobile body 10 moves under a basket cart 100. An example will now be described in which the mobile body 10 transports the basket cart 100.

The mobile body 10 raises the pedestal 16 by operating the raising/lowering device 17 in a state in which the pedestal 16 is positioned under the basket cart 100. The placement surface 16*a* of the pedestal 16 contacts the bottom surface of the basket cart 100. By further raising the pedestal 16, the basket cart 100 is lifted, and wheels 101 of the basket cart 100 separate from the traveling surface. Or, the raising/lowering device 17 may raise the pedestal 16 so that the wheels 101 are not separated from the traveling surface, and the basket cart 100 is supported from below. As a result, the entire load of the basket cart 100 can be prevented from being applied to the mobile body 10. The mobile body 10 transports the basket cart 100 by moving along the traveling surface in a state in which the placement surface 16*a* contacts the basket cart 100.

The environment map is referenced when moving the mobile body 10. The environment map is a map in which the surrounding environment within the range of movement of the mobile body 10 is shown in two dimensions. The environment map may be generated from sensor data of any time series, or may be generated using a drawing of the structure of a building. Preregistered locations are set in the environment map. The position of starting the movement, the position of ending the movement, the position of starting the transport of the basket cart 100, the position of unloading the basket cart 100, temporary stop positions, etc., are set as preregistered locations. When operating the mobile body 10, first, the start position of the operation of the mobile body 10 and the destination of the mobile body are set manually. The mobile body 10 generates a movement path from the current position of the mobile body 10 to the designated registered location while referring to position/orientation information and periphery information on the environment map, and follows the movement path. The position/orientation information indicates the position and orientation of the mobile body on the map. The orientation is represented by the angle around the vertical direction with respect to a reference orientation. The mobile body 10 may be actually positioned at any location in the state in which the position and orientation of the mobile body 10 indicated by the position/orientation information matches the position and orientation of the mobile body 10 on the environment map, and that position may be set as a registered location. The registered location may be set manually.

Figure 3:
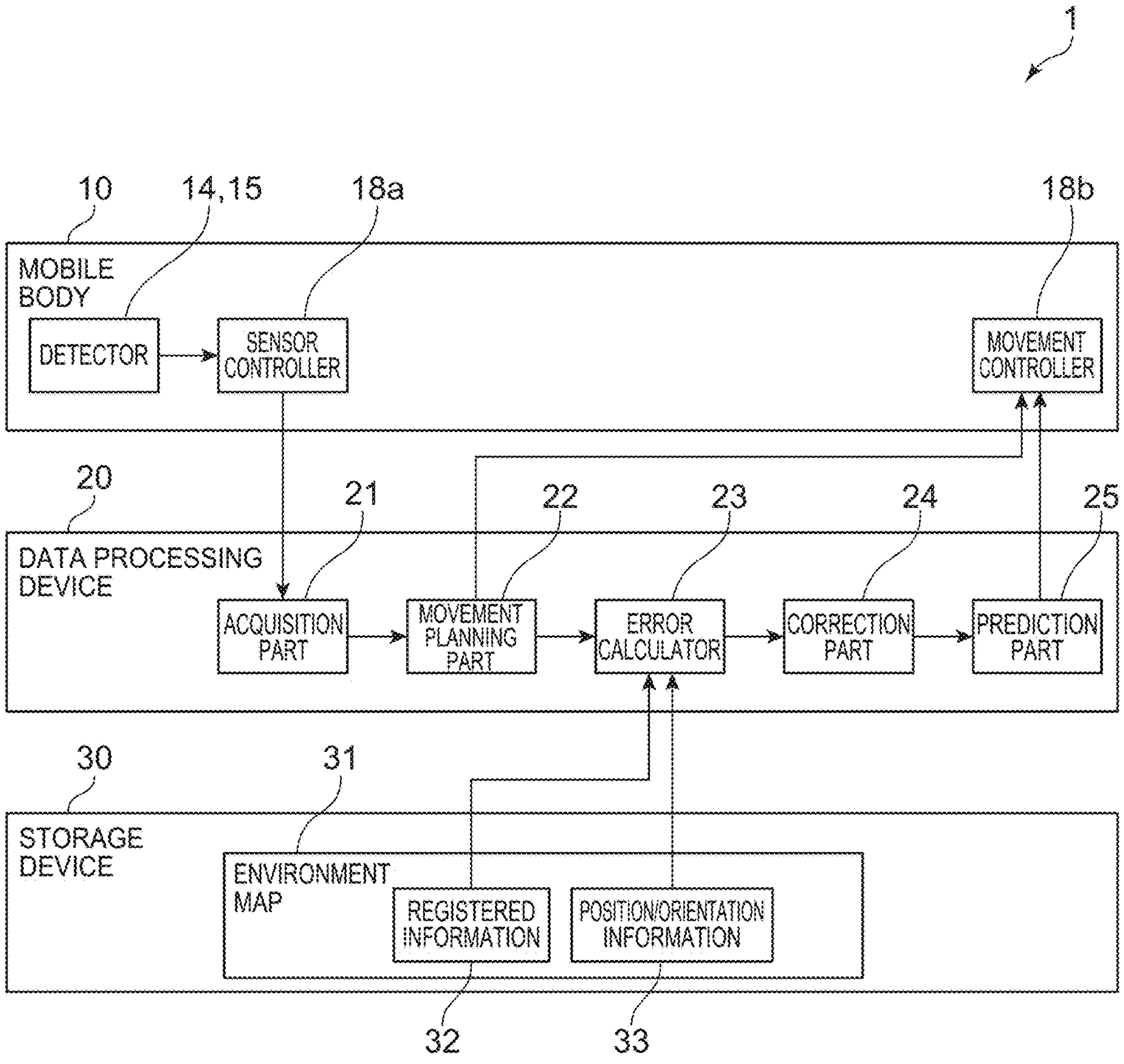
FIG. 3 is a schematic view showing a configuration of data processing according to the mobile body system according to the embodiment.

FIG. 3 is a schematic view showing a configuration of data processing according to the mobile body system according to the embodiment.

As shown in FIG. 3, the mobile body system 1 according to the embodiment includes the mobile body 10, a data processing device 20, and a storage device 30. The data processing device 20 processes data obtained by the mobile body 10, generates a plan related to the movement, etc. The storage device 30 stores data necessary for operations of the mobile body 10 such as an environment map 31, etc.

The control device 18 of the mobile body 10 functions as a sensor controller 18*a* and a movement controller 18*b*. The sensor controller 18*a* controls the external sensor 14 and the internal sensor 15. The sensor controller 18*a* also receives data detected by the external sensor 14 and the internal sensor 15.

The data processing device 20 functions as an acquisition part 21, a movement planning part 22, an error calculator 23, a correction part 24, and a prediction part 25. The acquisition part 21 acquires data of the sensors from the sensor controller 18*a* and calculates the position or orientation of the mobile body 10. The movement planning part 22 generates the movement plan of the mobile body 10 while referring to the calculated position or orientation. The movement plan indicates the necessary motion and movement amount for the mobile body 10 to move from one position to another position. The movement controller 18*b* controls the drive source 13 so that the mobile body 10 moves according to the movement plan.

The error calculator 23 calculates the error occurring due to the movement partway through implementing of the movement plan. The calculation of the error refers to registered information 32 and position/orientation information 33 of the environment map 31. Registered information 32 is data of the position and orientation of the mobile body 10 at a prescribed registered location in the environment map 31, and is calculated before moving to the registered location. The position/orientation information 33 is information of the position and orientation of the mobile body 10 calculated based on data from one of the sensors, and is calculated after moving to the registered location.

The correction part 24 corrects the remaining movement amount of the movement plan based on the calculated error. Based on the calculated error, the prediction part 25 predicts the error that will occur in the remaining movement of the movement plan. The prediction part 25 further corrects, based on the predicted error, the movement amount corrected by the correction part 24. The movement controller 18*b* controls the drive source 13 so that the mobile body 10 moves the movement amount output from the prediction part 25.

FIGS. 4A, 4B, 5A, and 5B are schematic views for describing the mobile body system according to the embodiment.

Figure 4A:
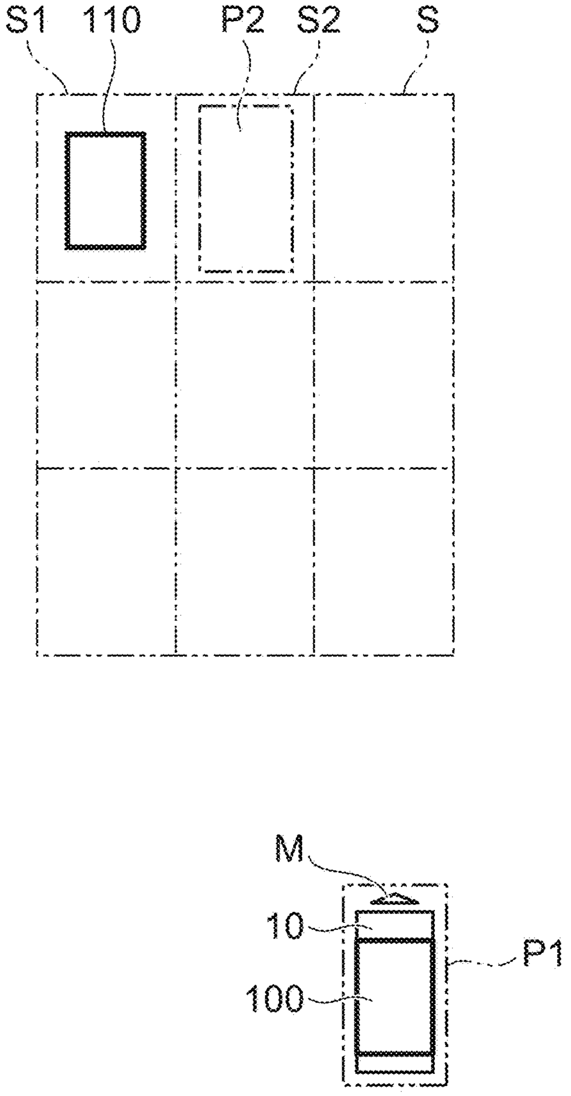
FIGS. 4A and 4B are schematic views for describing the mobile body system according to the embodiment.

A specific example of the mobile body system 1 will now be described with reference to FIGS. 4A to 5B. As shown in FIG. 4A, for example, the mobile body 10 is at a first position P1 (the current position). A mark M indicates the orientation of the mobile body 10. The direction indicated by the obtuse angle, the mark M, which is an isosceles triangle, indicates the front of the mobile body 10. Multiple virtual sections S are set at a location other than the first position P1. The multiple sections S are set to be arranged in two mutually-orthogonal directions. In the illustrated example, the sections S are set to be arranged 3 long×3 wide. The mobile body 10 transports basket carts to the sections S. In the illustrated example, a basket cart 110 is already located at a section S1. The mobile body 10 lifts the basket cart 100 at the first position P1 and transports the basket cart 100 to a second position P2 (the target position) inside a section S2 adjacent to the section S1.

At the first position P1, first, the acquisition part 21 acquires data of the external sensor 14. Based on the data, the acquisition part 21 calculates the relative positional relationship between the first position P1 and the second position P2. When the external sensor 14 is a LRF, the relative positional relationship of the second position P2 with respect to the first position P1 is calculated using point cloud data acquired by the LRF. Or, instead of the data of the external sensor 14, the acquisition part 21 may acquire position data that is pre-generated manually.

The movement planning part 22 generates a movement plan for the mobile body 10 to move from the first position P1 to the second position P2. Specifically, the movement plan includes a first movement and a second movement. The first movement is the movement from the first position P1 to a transit position P3, and includes the translational motion shown in FIG. 4B and the turning motion shown in FIG. 5A. The second movement is the movement from the transit position P3 to the second position P2, and includes the multiple turning motions (a slalom motion) shown in FIG. 5B. Due to the turning motions, a portion of the mobile body 10 moves in an arc-like shape. The second movement is the motion after the first movement. The first position P1, the second position P2, and the transit position P3 each are set as registered locations of the environment map 31. The transit position P3 is a position through which the mobile body 10 travels from the first position P1 to the second position P2. The movement plan includes the starting positions of the motions, the movement amounts of the motions, etc., of the first and second movements.

The movement controller 18*b* causes the mobile body 10 to perform the first movement by controlling the drive source 13. First, the mobile body 10 travels forward toward the second position P2 in the translational motion shown in FIG. 4B. The mobile body 10 stops at a location so that the second position P2 is positioned obliquely frontward of the mobile body 10. For example, the stop position of the mobile body 10 is set inside the section S one column in front of the second position P2, which is the target. Subsequently, the mobile body 10 turns 180 degrees in the turning motion shown in FIG. 5A. As a result, the second position P2 is positioned behind the mobile body 10.

When the first movement is completed, the acquisition part 21 acquires data obtained by the sensors and calculates the position/orientation information 33. When the external sensor 14 is a LRF or a camera, the acquisition part 21 generates a map of the information of the surroundings of the mobile body 10 based on the data obtained by the LRF or the camera. The generated map indicates the position and orientation of the mobile body 10 with respect to the surrounding objects. The position and orientation of the mobile body 10 at the transit position P3 in the map generated by the acquisition part 21 are calculated as the position/orientation information 33.

The error calculator 23 uses the position/orientation information 33 calculated by the acquisition part 21 and the registered information 32 included in the environment map 31 to calculate the first error that includes a first turning error. The registered information 32 includes the position and orientation of the mobile body 10 at the registered location. For example, the transit position P3 is set as a registered location; and the position and orientation of the mobile body 10 at the transit position P3 is pre-calculated. The error calculator 23 calculates the difference between the orientation of the mobile body 10 at the transit position P3 of the registered information 32 and the orientation of the mobile body 10 at the transit position P3 of the position/orientation information 33 as the first turning error occurring due to the turning motion of the first movement. The first error may include a first translation error in addition to the first turning error. For example, the error calculator 23 may calculate the difference between the transit position P3 of the registered information 32 and the position of the mobile body 10 of the position/orientation information 33 as the first translation error occurring due to the translational motion of the first movement.

The correction part 24 corrects the movement amount of the second movement based on the first error to reduce the difference between the target second position P2 and the position of the mobile body 10 after the second movement. The corrected movement amount (x2, y2) is represented by the following Formula 1, wherein "x1" is the movement amount in the X-direction in the second movement, "y1" is the movement amount in the Y-direction in the second movement, and Δθ is the first turning error.

$$\begin{pmatrix} x2 \\ y2 \end{pmatrix} = \begin{pmatrix} \cos\Delta\theta & -\sin\Delta\theta \\ \sin\Delta\theta & \cos\Delta\theta \end{pmatrix} \begin{pmatrix} x1 \\ y1 \end{pmatrix} \quad \text{[Formula 1]}$$

Based on the first error calculated by the error calculator 23, the prediction part 25 predicts a second error that will occur in the second movement. The second error includes a second turning error predicted to occur in the turning motion of the second movement. The second turning error is predicted based on the first turning error. Based on the predicted second error, the prediction part 25 further corrects the movement amount corrected by the correction part 24. For example, the first turning error when turning an angle θ1 in the turning motion of the first movement is taken as Δθ. The movement amount (x3, y3) that is corrected when turning an angle θ2 in the turning motion of the second movement is represented by the following Formula 2.

$$\begin{pmatrix} x3 \\ y3 \end{pmatrix} = \left(1 + \frac{\Delta\theta}{\theta 1} \cdot \frac{\theta 2}{\theta 1}\right) \begin{pmatrix} x2 \\ y2 \end{pmatrix} \quad \text{[Formula 2]}$$

In the illustrated example, the first movement includes a turning motion of 180 degrees. The second movement includes a right turning motion of 90 degrees and a left turning motion of 90 degrees. The angles θ1 and θ2 each are 180 degrees.

When the second movement includes a translational motion, a second translation error of the translational motion of the second movement may be predicted based on the first translation error of the translational motion of the first movement. For example, the ratio of the first translation error to the movement amount of the translational motion of the first movement is calculated. The second translation error is predicted by multiplying the ratio by the movement amount of the translational motion of the second movement. In such a case, the second error includes the second translation error and the second turning error. The movement amount is corrected using the second translation error and the second turning error.

Figure 5A:
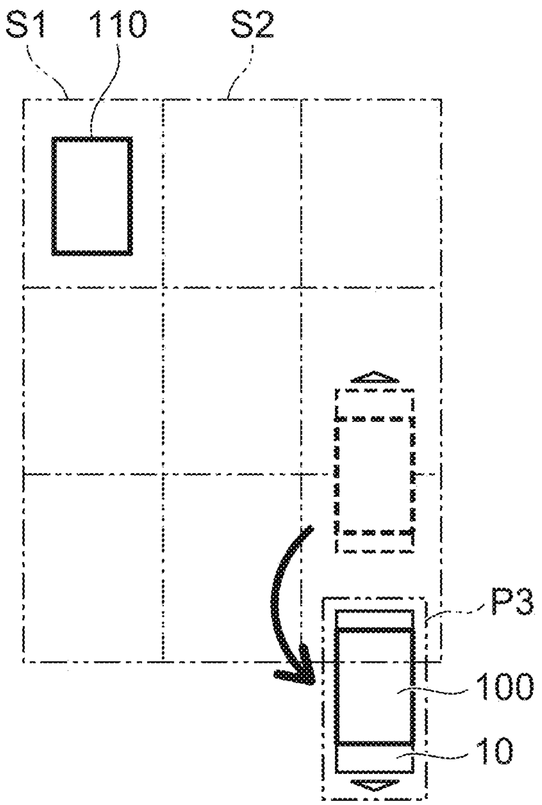
FIGS. 5A and 5B are schematic views for describing the mobile body system according to the embodiment.
Figure 5B:
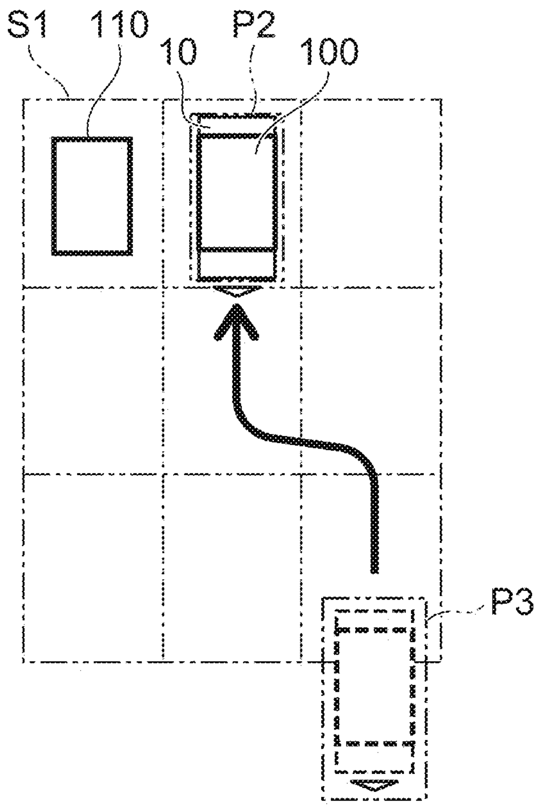

The prediction part 25 transmits the corrected movement amount (x3, y3) to the movement controller 18*b*. The movement controller 18*b* controls the drive source 13 to move the mobile body 10 the movement amount (x3, y3). As shown in FIG. 5B, the mobile body 10 turns backward/rightward and backward/leftward toward the second position P2. One or more turns rightward and one or more turns leftward are alternately performed.

There are cases where a safety zone is set in front of the mobile body 10 to avoid impacts between the mobile body 10 and other objects. The mobile body 10 stops when an object is detected inside the safety zone. When a safety zone is set in front of the mobile body 10, and if the mobile body 10 moves frontward toward the second position P2, the mobile body 10 approaches the basket cart 110 that is already placed, and the basket cart 110 is detected inside the safety zone. As a result, the mobile body 10 can no longer be moved toward the second position P2. By moving toward the second position P2 backward as shown in FIG. 5B, even when the safety zone is set in front of the mobile body 10, the basket cart 100 being transported can be transported adjacent to the basket cart 110 that is already placed.

When the mobile body 10 moves to the second position P2, the mobile body 10 lowers the pedestal 16. As a result, the basket cart 100 is placed inside the section S2. The mobile body 10 moves toward the next transport target.

Figure 6:
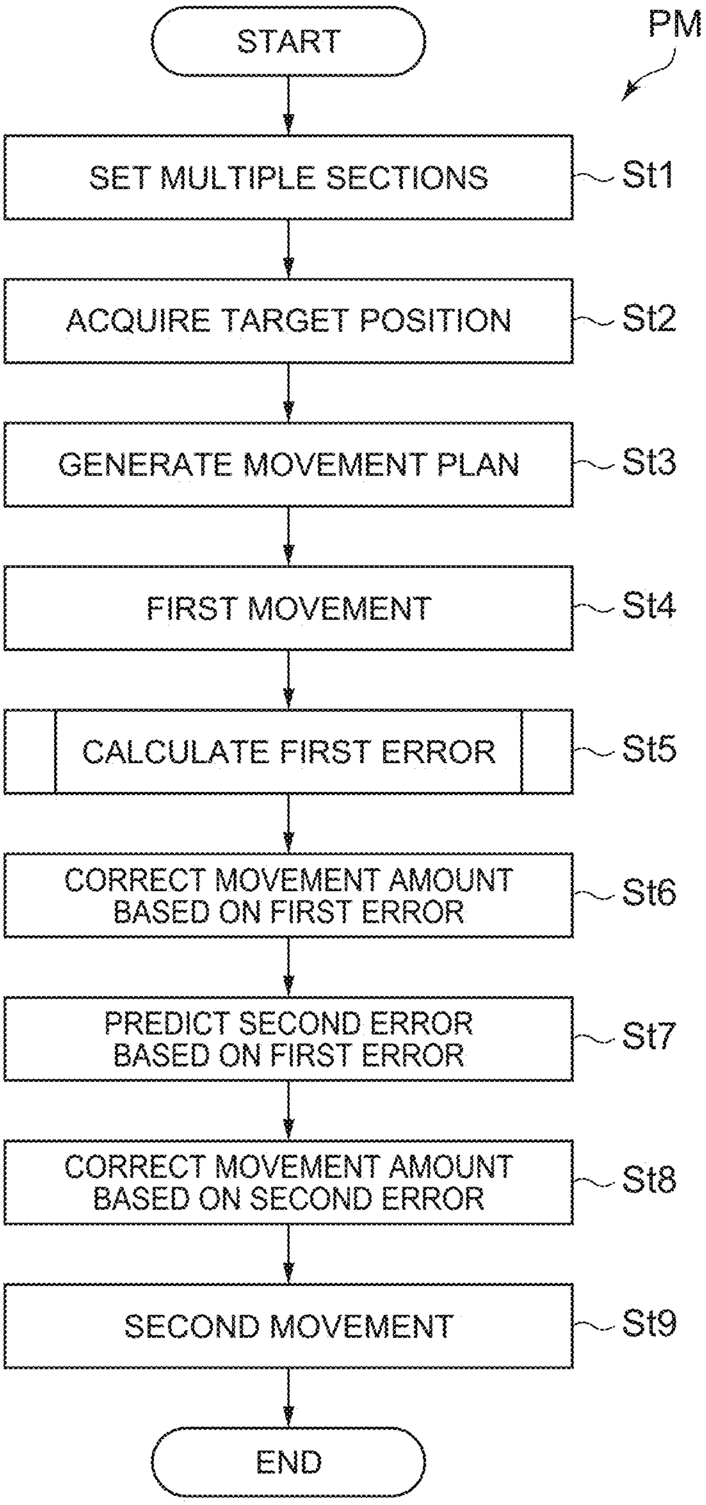
FIG. 6 is a flowchart showing a data processing method according to the embodiment.
Figure 7:
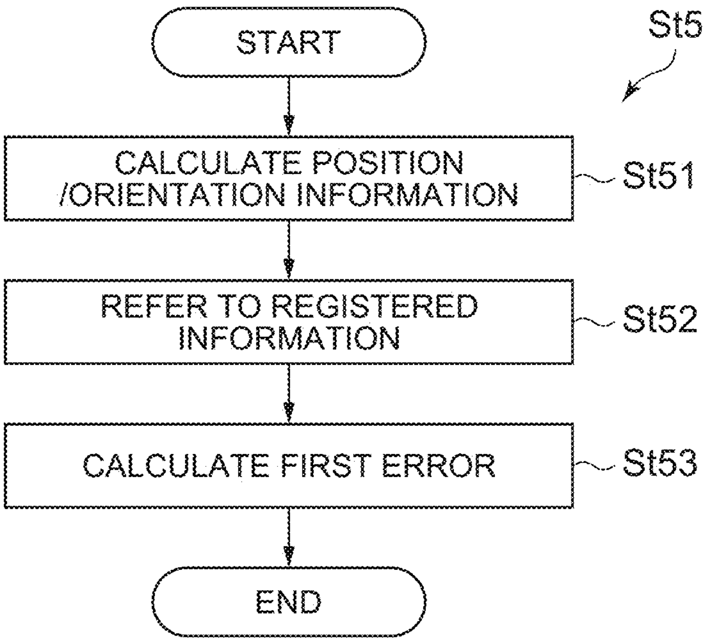
FIG. 7 is a flowchart showing a data processing method according to the embodiment.

FIGS. 6 and 7 are flowcharts showing a data processing method according to the embodiment.

Figure 4B:
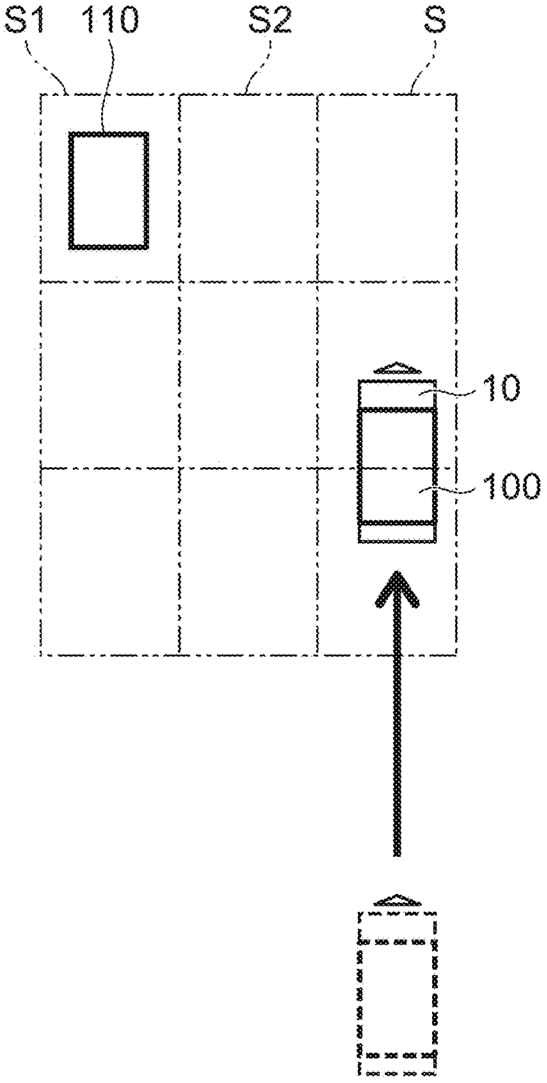

In the data processing method PM according to the embodiment, the movement planning part 22 sets the multiple sections S as shown in FIG. 4A (step St1). The acquisition part 21 acquires one of the multiple sections S as the target position (step St2). The movement planning part 22 calculates the relative positional relationship between the current position and the target position and generates a movement plan (step St3). The mobile body 10 performs the first movement (step St4). As a result, for example, as shown in FIG. 4B, the mobile body 10 moves to the transit position P3. The error calculator 23 calculates the first error occurring in the first movement (step St5). Based on the first error, the correction part 24 corrects the movement amount of the second movement (step St6). Based on the first error, the prediction part 25 predicts the second error occurring in the second movement (step St7). Based on the second error, the prediction part 25 further corrects the movement amount (step St8). The mobile body 10 performs the second movement according to the corrected movement amount (step St9).

FIG. 7 is a flowchart illustrating specific processing of step St5 shown in FIG. 6. The data processing device 20 uses data from the sensors to calculate the position/orientation information at the transit position P3 after the first movement (step St51). The data processing device 20 refers to the registered information at the transit position P3 (step St52). The data processing device 20 calculates the first turning error by comparing the orientation of the position/orientation information and the orientation of the registered information (step St53).

Although the position/orientation information is compared with the registered information in the example above, it is also possible to compare the position/orientation information with the movement amount of the first movement of the movement plan. The difference between the position/orientation information at the first position P1 and the position/orientation information at the transit position P3 corresponds to the actual movement amount of the mobile body 10. If the difference matches the planned movement amount of the first movement, then there is no error in the movement amount of the mobile body 10. The error calculator 23 may calculate the first error by comparing the actual movement amount and the planned movement amount of the first movement.

Advantages of the embodiment will now be described.

There are cases where an error of the movement amount of the mobile body 10 occurs due to slipping of the wheel 12 with respect to the traveling surface when the mobile body 10 moves. Slipping also occurs easily when the mobile body 10 transports an object (a basket cart) because the mobile body 10 is driven with a larger force. When a portion (the wheels) of the object being transported contacts the traveling surface as shown in FIG. 2B, slipping also occurs between the traveling surface and such wheels, and the error is further increased. A method may be considered in which the mobile body 10 and the basket cart 100 are moved after the basket cart is transported by the amount of the error that occurred. When, however, the basket cart 100 is transported to be adjacent to the basket cart 110 that is already placed as shown in FIG. 5B, there is a possibility that the basket cart 100 being transported may contact the basket cart 110 that is already placed due to the error that occurred. Therefore, technology is desirable in which the mobile body 10 can be moved with higher accuracy to the set position.

For this problem, first, the data processing device 20 according to the embodiment calculates the first error occurring in the first movement from the first position P1 to the transit position P3. Based on the calculated first error, the data processing device 20 predicts the second error occurring in the second movement from the transit position P3 to the second position P2. In other words, the error that occurred in a portion of the movement plan that is already performed is used to predict the error occurring in another portion of the movement plan to be subsequently performed. The data processing device 20 uses the first and second errors to correct the movement amount of the second movement. The movement amount is corrected based on the first error that already occurred, and the movement amount is further corrected based on the second error predicted to occur; as a result, the mobile body 10 can move with higher accuracy to the second position P2.

This method is particularly effective when various data such as the weight of the mobile body 10, the weight of the basket cart 100 to be transported, the friction coefficient of the wheel 12, the friction coefficient of the wheel 101, the friction coefficient of the traveling surface, etc., are not available. It is also possible to pre-estimate the movement amount due to slipping when such data is available. However, time and effort are necessary to prepare data for all of the basket carts to be transported. According to the embodiment, such data can be omitted because the second error can be predicted based on the first error occurring in the first movement.

Compared to a translational motion, slipping occurs particularly easily in a turning motion. The movement amount due to slipping in the turning motion is greater than the movement amount due to slipping in the translational motion. Therefore, the embodiment is effective at least when calculating or predicting the turning error. It is favorable for the data processing device 20 to calculate the first turning error occurring in the first movement, predict the second turning error occurring in the second movement based on the first turning error, and use these turning errors to correct the movement amount of the second movement.

The embodiment is particularly effective for a differential-drive mobile body. A differential-drive mobile body has various advantages compared to an omni-directionally-movable mobile body. For example, compared to an omni-directionally-movable mobile body, the mechanism or structure of a differential-drive mobile body is simple and easy to realize. Also, when calculating the motion of the mobile body, the motion can be expressed using simpler formulas. On the other hand, the directions in which a differential-drive mobile body can move are limited. For example, when the mobile body includes an omniwheel mechanism, a mecanum wheel mechanism, etc., and is omni-directionally movable, the error that occurs is calculated in real time when moving the mobile body; and the error can be corrected. Even when an error occurs when moving along the route shown in FIG. 5B, the basket cart 100 being transported can be prevented from contacting the basket cart 110 that is already placed by correcting the error while moving. For a differential-drive mobile body, it is difficult to correct the error while moving because the directions of movement are limited. However, according to the embodiment, the error that will occur in a future movement can be predicted and the movement amount can be corrected; therefore, the mobile body 10 can move to the set position with high accuracy even when it is difficult to correct the error when moving.

First Modification

FIGS. 8A, 8B, and 9A to 9C are schematic views for describing a mobile body system according to a first modification of the embodiment.

In the mobile body system according to the first modification, the method for calculating the first error is different from the method described above. A specific example of the method for calculating the first error according to the first modification will now be described with reference to FIGS. 8A to 9C. The method according to the first modification is effective when a plane of the object is present proximate to the target position. In the specific example, the first movement includes the translational motion shown in FIG. 8B and the turning motion shown in FIG. 9A. The second movement includes the turning motion shown in FIG. 9B and the turning motion shown in FIG. 9C.

Figure 8A:
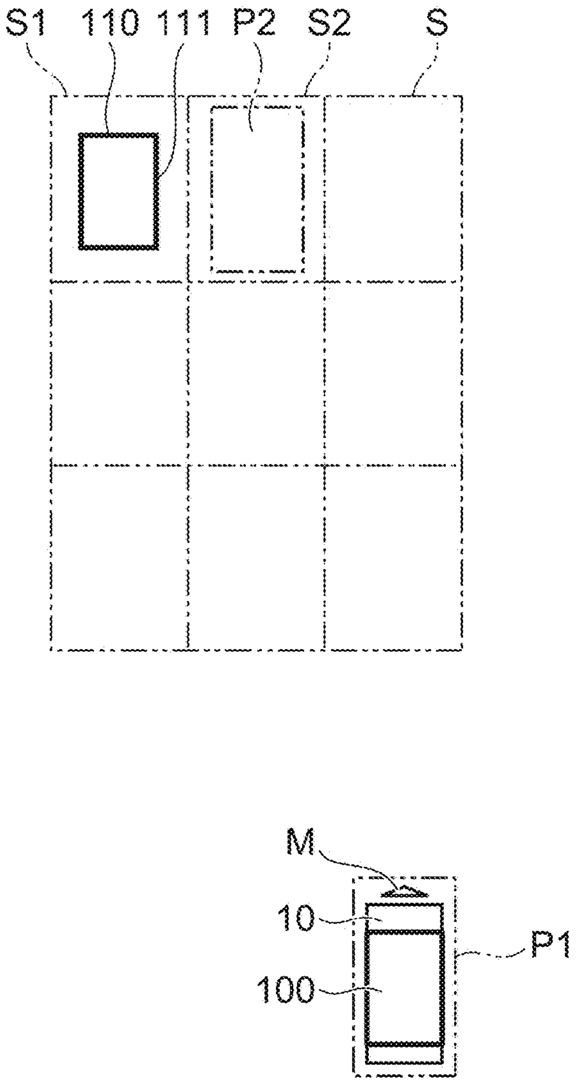
FIGS. 8A and 8B are schematic views for describing a mobile body system according to a first modification of the embodiment.
Figure 8B:
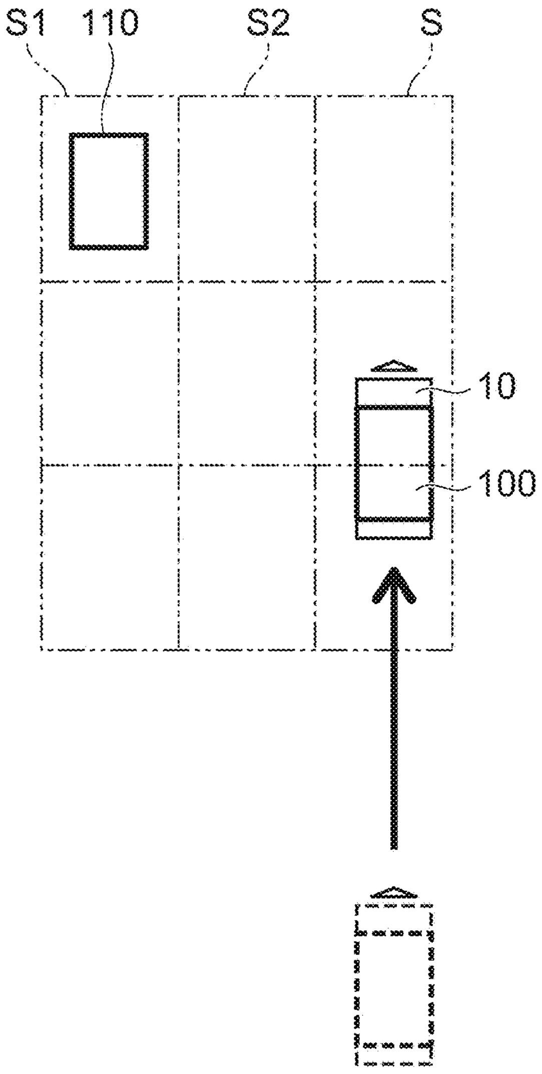

First, as shown in FIG. 8A, the external sensor 14 acquires data of the second position P2 vicinity in a state in which the mobile body 10 is at the first position P1. In the illustrated example, the basket cart 110 is placed adjacent to the second position P2. The acquisition part 21 uses the data of the external sensor 14 to calculate the relative position and the relative orientation of the mobile body 10 with respect to a side surface 111 of the basket cart 110. Continuing as shown in FIG. 8B, the mobile body 10 travels forward toward the second position P2.

Figure 9A:
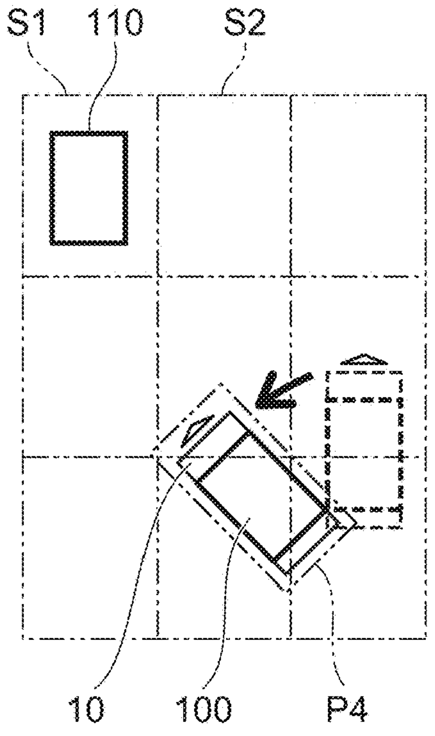
FIGS. 9A to 9C are schematic views for describing a mobile body system according to a first modification of the embodiment.

After traveling forward, the mobile body 10 performs a turning motion as shown in FIG. 9A. At this time, the mobile body 10 turns an angle that is less than 180 degrees. The mobile body 10 turns and stops at a transit position P4. The acquisition part 21 uses data of the external sensor 14 to calculate the relative position and the relative orientation of the mobile body 10 with respect to the side surface 111 of the basket cart 110 in a state in which the mobile body 10 is at the transit position P4. The error calculator 23 calculates the difference between the relative position and the relative orientation of the mobile body 10 with respect to the side surface 111 at the transit position P4 and the relative position and the relative orientation of the mobile body 10 with respect to the side surface 111 at the first position P1. The difference corresponds to the actual movement amount of the mobile body 10. The movement amount of the mobile body 10 in the environment map matches the calculated movement amount when there is no error in the movement amount of the mobile body 10. The error calculator 23 calculates the difference between the movement amount of the mobile body 10 in the environment map and the calculated movement amount as the first error of the first movement.

Figure 9B:
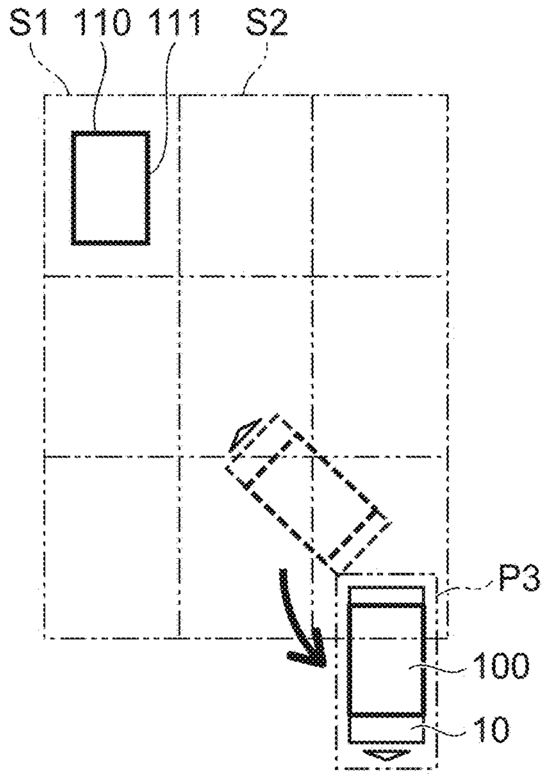
Figure 9C:
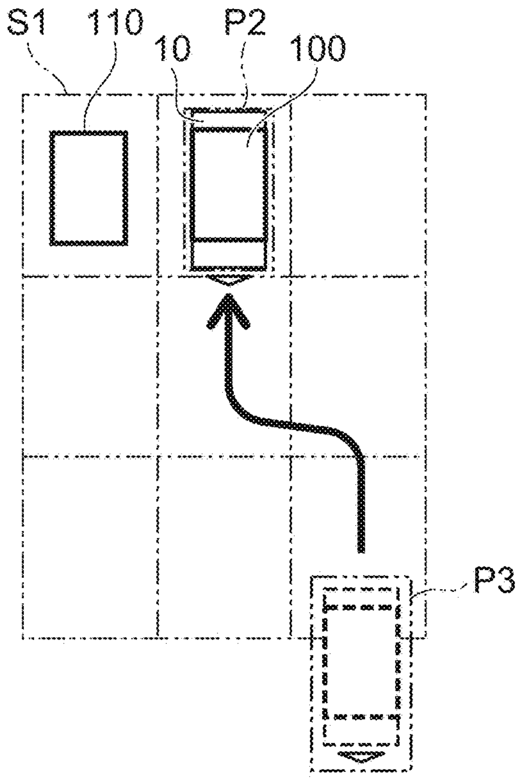

Based on the first error, the correction part 24 corrects the movement amount in the turning motion shown in FIG. 9B and the turning motion shown in FIG. 9C, which are performed subsequently. Based on the first error, the prediction part 25 predicts the second errors occurring in these turning motions. The second errors respectively include the second turning errors occurring in the turning motions. The prediction part 25 further corrects the movement amount. The mobile body 10 performs the turning motion to the transit position P3 shown in FIG. 9B and the turning motion to the second position P2 shown in FIG. 9C according to the corrected movement amount.

Figure 10:
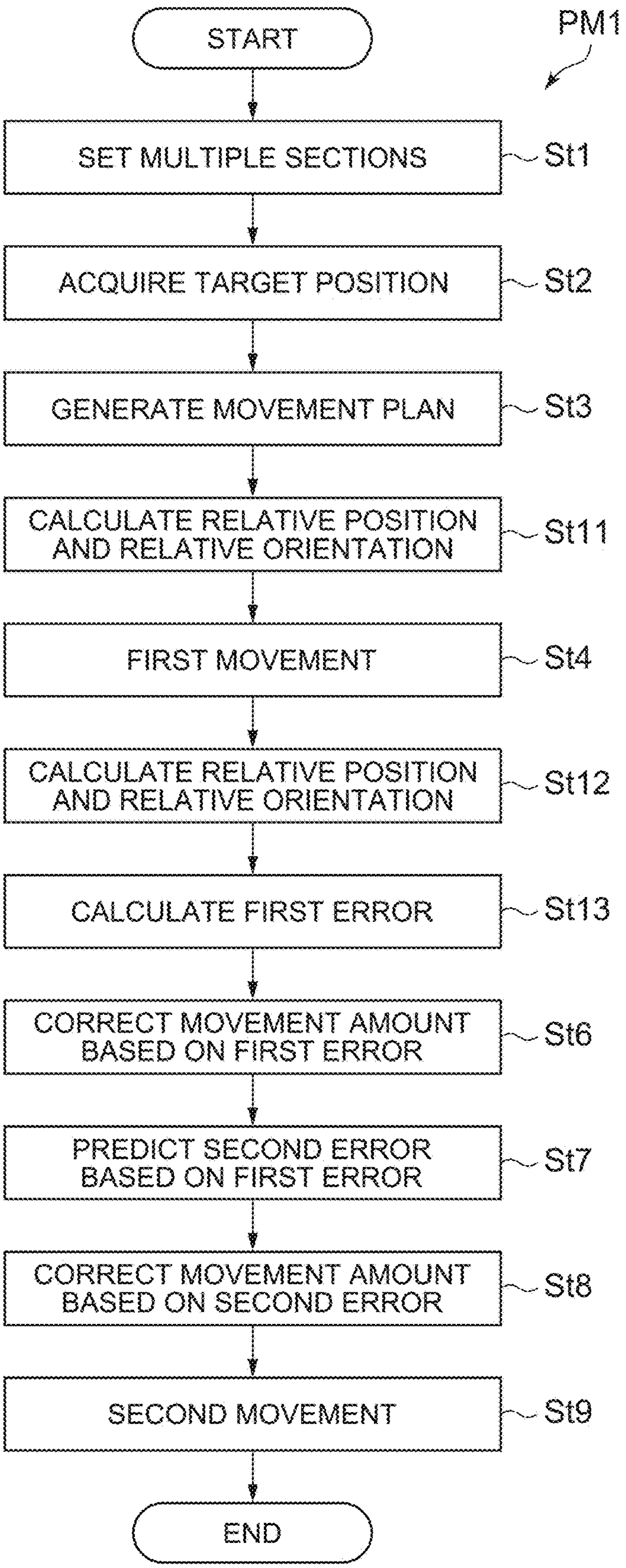
FIG. 10 is a flowchart showing a data processing method according to the first modification of the embodiment.

FIG. 10 is a flowchart showing a data processing method according to the first modification of the embodiment.

Compared to the data processing method PM shown in FIG. 6, the data processing method PM1 according to the first modification shown in FIG. 10 further includes steps St11 and St12, and includes step St13 instead of step St5. First, similarly to the data processing method PM shown in FIG. 6, steps St1 to St3 are performed. Subsequently, the acquisition part 21 calculates the relative position and the relative orientation of the mobile body 10 with respect to the object to be referenced (step St11). The first movement is performed (step St4). At the position after the first movement, the acquisition part 21 calculates the relative position and the relative orientation of the mobile body 10 with respect to the referenced object (step St12). The error calculator 23 calculates the first error by comparing the relative position and the relative orientation calculated in step St11 and the relative position and the relative orientation calculated in step St12 (step St13). Thereafter, other than the differences between the specific motions of the second movement, steps St6 to St9 are performed similarly to those of the data processing method PM.

Second Modification

Figure 11:
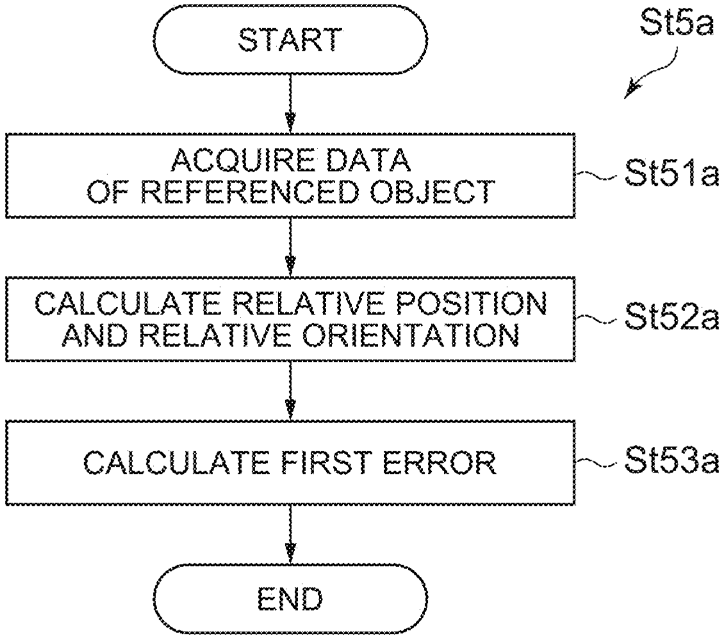
FIG. 11 is a flowchart showing a data processing method according to a second modification of the embodiment.

FIG. 11 is a flowchart showing a data processing method according to a second modification of the embodiment.

In the mobile body system according to the second modification, the method for calculating the first error is different from the method described above. Similarly to the first modification, the method according to the second modification calculates the first error by referring to a portion of an object proximate to the target position. The motion of the mobile body 10 according to the second modification is similar to, for example, the motion shown in FIGS. 4A to 5B.

As shown in FIG. 11, in the data processing method according to the second modification, step St5*a* is performed instead of step St5 shown in FIG. 7. First, similarly to the data processing method PM shown in FIG. 6, steps St1 to St4 are performed. As a result, the mobile body 10 moves to the transit position P3. Subsequently, the external sensor 14 that is located at the back of the mobile body 10 acquires data of the referenced object (step St51*a*). For example, the referenced object is a wheel of the basket cart 110 that is already placed. The acquisition part 21 uses the data to calculate the relative position and the relative orientation of the wheel with respect to the mobile body 10 (step St52*a*). When the position and orientation of the wheel of the basket cart 110 are preregistered, the first error is calculated by comparing the relative position and the relative orientation of the wheel with respect to the mobile body 10 to the position and orientation of the registered wheel (step St53*a*). When the position and orientation of the wheel of the basket cart 110 are not registered, the relative position and the relative orientation of the wheel of the basket cart 110 may be calculated in the state in which the mobile body 10 is at the first position P1 similarly to the first modification.

Third Modification

Figure 12:
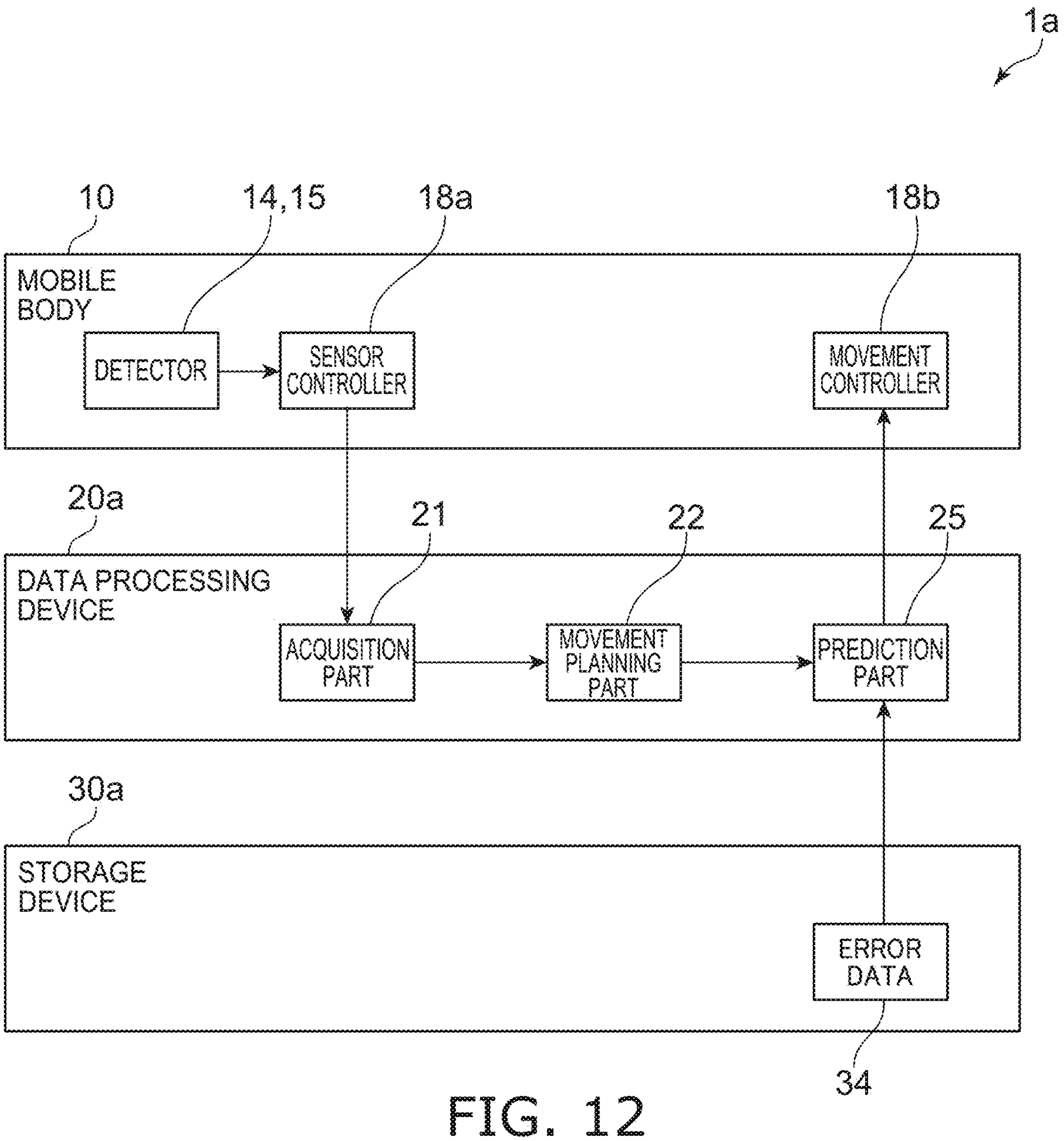
FIG. 12 is a schematic view showing a configuration of data processing according to a mobile body system according to a third modification of the embodiment.

FIG. 12 is a schematic view showing a configuration of data processing according to a mobile body system according to a third modification of the embodiment.

In the data processing method described above, the second error is predicted based on the first error that occurs in a portion of the movement plan. According to the method described above, the second error can be predicted with high accuracy even when data such as the weight of the mobile body 10, the weight of the basket cart 100, the friction coefficient of the wheel 12, the friction coefficient of the wheel 101, the friction coefficient of the traveling surface, etc., are not available. Herein, such data is called condition data. When the condition data is available, it is also possible to predict the error before implementing the movement plan.

The mobile body system 1*a* according to the third modification shown in FIG. 12 includes the mobile body 10, a data processing device 20*a*, and a storage device 30*a*. The data processing device 20*a* functions as the acquisition part 21, the movement planning part 22, and the prediction part 25. For example, the relationship between the movement amount and the error for combinations of conditions such as the weight of the mobile body 10, the weight of the basket cart 100, the friction coefficient of the wheel 12, the friction coefficient of the wheel 101, the friction coefficient of the traveling surface, etc., are premeasured while changing the conditions. The relationship between the movement amount and the error for various conditions is summarized in a table as error data 34, and is stored in the storage device 30*a*.

The movement planning part 22 generates a movement plan from the current position (the first position) to the target position (the second position). The prediction part 25 acquires condition data related to the mobile body 10, condition data related to the basket cart 100 to be transported, etc. The prediction part 25 also refers to the error data 34 and acquires the error corresponding to the acquired condition data and the movement amount shown in the movement plan. The acquired error is the error predicted to occur in the movement plan. The prediction part 25 corrects the movement amount of the movement plan based on the acquired error. The movement controller 18*b* moves the mobile body 10 according to the corrected movement amount.

Figure 13:
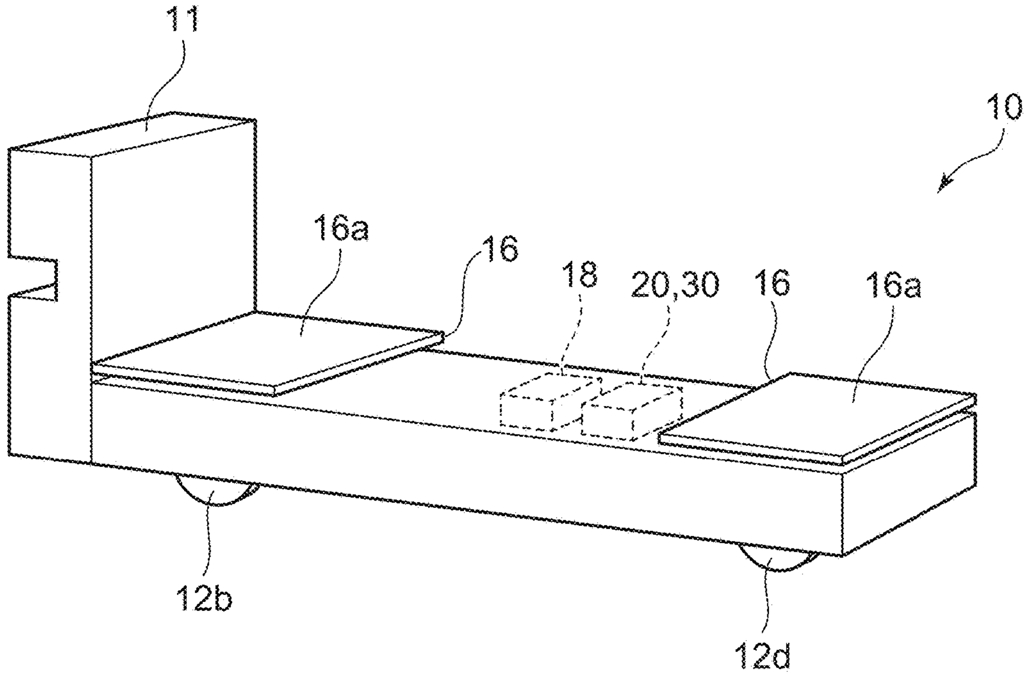
FIG. 13 is a perspective view schematically showing the mobile body according to the embodiment.

FIG. 13 is a perspective view schematically showing the mobile body according to the embodiment.

According to the embodiments above, the data processing device 20 and the storage device 30 may be located separately from the mobile body 10 and may communicate with the mobile body 10 (the control device 18). Or, as shown in FIG. 13, the data processing device 20 and the storage device 30 may be embedded in the mobile body 10. The mobile body 10 functions as the data processing device 20. For example, the mobile body 10 calculates the first error occurring in the first movement from the first position P1 to the transit position P3, which includes a translational motion and a turning motion. Based on the first error, the mobile body 10 predicts the second error occurring in the second movement from the transit position P3 to the second position P2, which includes a turning motion. The mobile body 10 uses the first and second errors to correct the movement amount of the mobile body 10 in the second movement.

Figure 14:
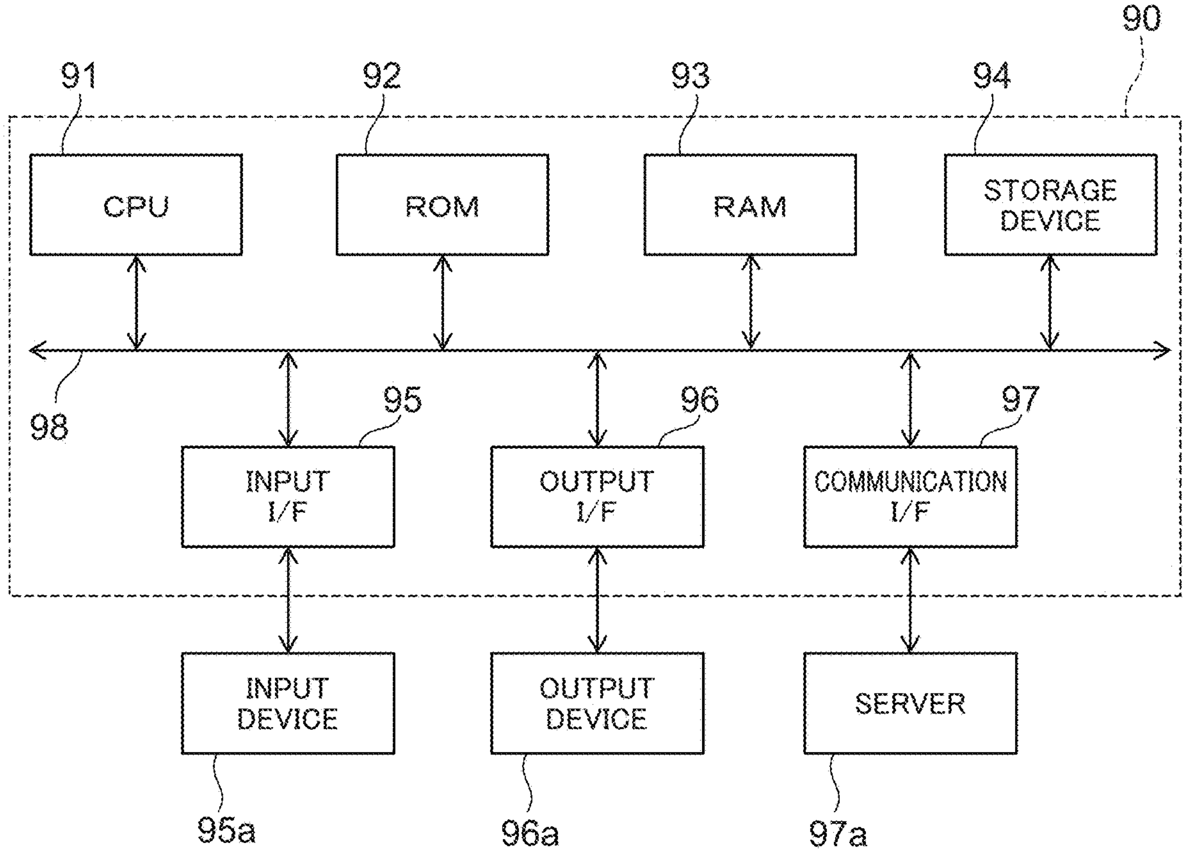
FIG. 14 is a schematic view illustrating a hardware configuration.

FIG. 14 is a schematic view illustrating a hardware configuration.

For example, a computer 90 shown in FIG. 14 is used as the control device 18, the data processing device 20, or the data processing device 20*a*. The computer 90 includes a CPU 91, ROM 92, RAM 93, a storage device 94, an input interface 95, an output interface 96, and a communication interface 97.

The ROM 92 stores programs controlling operations of the computer 90. The ROM 92 stores programs necessary for causing the computer 90 to realize the processing described above. The RAM 93 functions as a memory region into which the programs stored in the ROM 92 are loaded.

The CPU 91 includes a processing circuit. The CPU 91 uses the RAM 93 as work memory and executes the programs stored in at least one of the ROM 92 or the storage device 94. When executing the programs, the CPU 91 executes various processing by controlling configurations via a system bus 98.

The storage device 94 stores data necessary for executing the programs and/or data obtained by executing the programs.

The input interface (I/F) 95 can connect the computer 90 and an input device 95*a*. The input I/F 95 is, for example, a serial bus interface such as USB, etc. The CPU 91 can read various data from the input device 95*a* via the input I/F 95.

The output interface (I/F) 96 can connect the computer 90 and an output device 96*a*. The output I/F 96 is, for example, an image output interface such as Digital Visual Interface (DVI), High-Definition Multimedia Interface (HPMI (registered trademark)), etc. The CPU 91 can transmit data to the output device 96*a* via the output I/F 96 and cause the output device 96*a* to display an image.

The communication interface (I/F) 97 can connect the computer 90 and a server 97*a* outside the computer 90. The communication I/F 97 is, for example, a network card such as a LAN card, etc. The CPU 91 can read various data from the server 97*a* via the communication I/F 97.

The storage device 94 includes at least one selected from a hard disk drive (HDD) and a solid state drive (SSD). The input device 95*a* includes at least one selected from a mouse, a keyboard, a microphone (audio input), and a touchpad. The output device 96*a* includes at least one selected from a monitor, a projector, a printer, and a speaker. A device such as a touch panel that functions as both the input device 95*a* and the output device 96*a* may be used.

The processing performed by the control device 18, the data processing device 20, or the data processing device 20*a* may be realized by one computer 90, or may be realized by the collaboration of multiple computers 90. When the data processing device 20 is embedded in the mobile body 10 as shown in FIG. 13, one computer 90 may function as the control device 18 and the data processing device 20.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another non-transitory computer-readable storage medium.

For example, the information that is recorded in the recording medium can be read by a computer (or an embedded system). The recording format (the storage format) of the recording medium is arbitrary. For example, the computer reads a program from the recording medium and causes a CPU to execute the instructions recited in the program based on the program. In the computer, the acquisition (or the reading) of the program may be performed via a network.

The embodiments of the present invention includes the following features.

(Feature 1)

A data processing device, configured to:

process data related to a mobile body, the mobile body moving by autonomously traveling over a traveling surface, calculate a first error occurring in a first movement from a first position to a transit position, the first movement including a translational motion and a turning motion, predict, based on the first error, a second error occurring in a second movement from the transit position to a second position, the second movement including a turning motion; and correct a movement amount of the mobile body in the second movement by using the first and second errors.

(Feature 2)

The device according to feature 1, wherein the first error includes a first turning error occurring in the turning motion of the first movement, and the second error includes a second turning error predicted to occur in the turning motion of the second movement.

(Feature 3)

The device according to feature 2, wherein the second movement includes a plurality of turning motions, and the second error includes a plurality of the second turning errors predicted to occur respectively in the plurality of turning motions.

(Feature 4)

The device according to feature 2 or 3, wherein the first turning error is calculated based on a comparison between:

an orientation of the mobile body at the transit position in which the orientation is calculated using data obtained from a first sensor of the mobile body; and an orientation of the mobile body at the transit position in which the orientation is preset before the first movement.

(Feature 5)

The device according to feature 2 or 3, wherein the first turning error is calculated based on a comparison between:

a movement amount of the mobile body in the first movement in which the movement amount is calculated using data obtained from a first sensor of the mobile body; and a movement amount of the mobile body in the first movement in which the movement amount is preplanned.

(Feature 6)

The device according to feature 2 or 3, wherein the first error is calculated using a relative position and a relative orientation of the mobile body with respect to an object, the object being prescribed, and the relative position and the relative orientation are calculated using data obtained from a second sensor of the mobile body.

(Feature 7)

The device according to feature 2 or 3, wherein the first error is predicted based on a weight of the mobile body, a weight of a transport object to be transported by the mobile body, a friction coefficient of a wheel of the mobile body, a friction coefficient of a wheel of the transport object, and a friction coefficient of the traveling surface.

(Feature 8)

A data processing device, configured to:

process data related to a mobile body moving over a floor surface;

calculate a movement amount from a first position to a second position;

predict an error occurring in a movement to the second position; and correct the movement amount by using the error.

(Feature 9)

A mobile body system, comprising:

a mobile body moving by autonomously traveling over a traveling surface; and the device according to any one of features 1 to 8, the mobile body moving according to the corrected movement amount.

(Feature 10)

The system according to feature 9, wherein the mobile body is moved by a differential drive technique.

According to embodiments above, a data processing device, a mobile body system, a mobile body, a data processing method, a program, and a storage medium are provided in which a mobile body can move with higher accuracy to a set position.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. A data processing device, configured to process data related to a mobile body, the mobile body moving by autonomously traveling over a traveling surface, the data processing device comprising:

one or more processors; and a memory storing instructions that, when executed by the one or more processors, cause the one or more processors to after completion of a first movement from a first position to a transit position, calculate a first error occurring in the first movement, the first movement including a translational motion in which an orientation of the mobile body is maintained and a turning motion in which the orientation changes, wherein the first error includes a first translational error caused by the translational motion of the first movement and a first turning error caused by the turning motion of the first movement, correct, by using the first translational error and the first turning error, a movement amount of the mobile body in a second movement from the transit position to a second position, the second movement including another translational motion and another turning motion, predict, based on the first error, a second error occurring in the second movement, wherein the second error includes a second translational error predicted to occur in the translational motion of the second movement based on the first translational error, and a second turning error predicted to occur in the turning motion of the second movement based on the first turning error, and further correct the corrected movement amount of the mobile body in the second movement by using the second translational error and the second turning error.

2. The device according to claim 1, wherein the second movement includes a plurality of turning motions, and the second error includes a plurality of the second turning errors predicted to occur respectively in the plurality of turning motions.

3. The device according to claim 1, wherein the first turning error is calculated based on a comparison between:

an orientation of the mobile body at the transit position in which the orientation is calculated using data obtained from a first sensor of the mobile body; and an orientation of the mobile body at the transit position in which the orientation is preset before the first movement.

4. The device according to claim 1, wherein the first turning error is calculated based on a comparison between:

a movement amount of the mobile body in the first movement in which the movement amount is calculated using data obtained from a first sensor of the mobile body; and a movement amount of the mobile body in the first movement in which the movement amount is preplanned.

5. The device according to claim 1, wherein the first translational error and the first turning error are calculated using a relative position and a relative orientation of the mobile body with respect to an object, the object being prescribed, and the relative position and the relative orientation are calculated using data obtained from a second sensor of the mobile body.

6. The device according to claim 1, wherein the first translational error and the first turning error are calculated based on a weight of the mobile body, a weight of a transport object to be transported by the mobile body, a friction coefficient of a wheel of the mobile body, a friction coefficient of a wheel of the transport object, and a friction coefficient of the traveling surface.

7. A mobile body system, comprising:

a mobile body moving by autonomously traveling over a traveling surface; and the device according to claim 1, the mobile body moving according to the corrected movement amount that is corrected using the first translational error, the first turning error, the second translational error, and the second turning error.

8. The system according to claim 7, wherein the mobile body is moved by a differential drive technique.

9. A mobile body configured to move by autonomously traveling over a traveling surface, the mobile body configured to:

after completion of a first movement from a first position to a transit position, calculate a first error occurring in the first movement, the first movement including a translational motion in which an orientation of the mobile body is maintained and a turning motion in which the orientation changes, wherein the first error includes a first translational error caused by the translational motion of the first movement and a first turning error caused by the turning motion of the first movement;

correct, by using the first translational error and the first turning error, a movement amount in a second movement from the transit position to a second position, the second movement including another translational motion and another turning motion;

predict, based on the first error, a second error occurring in the second movement, wherein the second error includes a second translational error predicted to occur in the translational motion of the second movement based on the first translational error, and a second turning error predicted to occur in the turning motion of the second movement based on the first turning error; and further correct the corrected movement amount in the second movement by using the second translational error and the second turning error.

10. The mobile body according to claim 9, wherein the second movement includes a plurality of turning motions, and the second error includes a plurality of the second turning errors predicted to occur respectively in the plurality of turning motions.

11. The mobile body according to claim 9, wherein the first turning error is calculated based on a comparison between:

an orientation of the mobile body at the transit position in which the orientation is calculated using data obtained from a first sensor of the mobile body; and an orientation of the mobile body at the transit position in which the orientation is preset before the first movement.

12. The mobile body according to claim 9, wherein the first turning error is calculated based on a comparison between:

a movement amount of the mobile body in the first movement in which the movement amount is calculated using data obtained from a first sensor of the mobile body; and a movement amount of the mobile body in the first movement in which the movement amount is preplanned.

13. The mobile body according to claim 9, wherein the first translational error and the first turning error are calculated using a relative position and a relative orientation of the mobile body with respect to an object, the object being prescribed, and the relative position and the relative orientation are calculated using data obtained from a second sensor of the mobile body.

14. The mobile body according to claim 9, wherein the first translational error and the first turning error are calculated based on a weight of the mobile body, a weight of a transport object to be transported by the mobile body, a friction coefficient of a wheel of the mobile body, a friction coefficient of a wheel of the transport object, and a friction coefficient of the traveling surface.

15. The mobile body according to claim 9, wherein the mobile body is moved by a differential drive technique.

16. A data processing method to process data related to a mobile body, the mobile body moving by autonomously traveling over a traveling surface, the data processing method comprising:

after completion of a first movement from a first position to a transit position, calculating a first error occurring in the first movement, the first movement including a translational motion in which an orientation of the mobile body is maintained and a turning motion in which the orientation changes, wherein the first error includes a first translational error caused by the translational motion of the first movement and a first turning error caused by the turning motion of the first movement;

correcting, by using the first translational error and the first turning error, a movement amount of the mobile body in a second movement from the transit position to a second position, the second movement including another translational motion and another turning motion;

predicting, based on the first error, a second error occurring in the second movement, wherein the second error includes a second translational error predicted to occur in the translational motion of the second movement based on the first translational error, and a second turning error predicted to occur in the turning motion of the second movement based on the first turning error; and further correcting the corrected movement amount of the mobile body in the second movement by using the second translational error and the second turning error.

17. A non-transitory computer-readable storage medium configured to store a program, the program, when executed by a computer, causing the computer to process data related to a mobile body, the mobile body moving by autonomously traveling over a traveling surface, the program further causing the computer to:

after completion of a first movement from a first position to a transit position, calculate a first error occurring in the first movement, the first movement including a translational motion in which an orientation of the mobile body is maintained and a turning motion in which the orientation changes, wherein the first error includes a first translational error caused by the translational motion of the first movement and a first turning error caused by the turning motion of the first movement;

correct, by using the first translational error and the first turning error, a movement amount of the mobile body in a second movement from the transit position to a second position, the second movement including another translational motion and another turning motion;

predict, based on the first error, a second error occurring in the second movement, wherein the second error includes a second translational error predicted to occur in the translational motion of the second movement based on the first translational error, and a second turning error predicted to occur in the turning motion of the second movement based on the first turning error; and further correct the corrected movement amount of the mobile body in the second movement by using the second translational error and the second turning error.

* * * * *